US008601041B2

(12) United States Patent
Gilbert et al.

(10) Patent No.: US 8,601,041 B2
(45) Date of Patent: Dec. 3, 2013

(54) METHOD AND DEVICE FOR GENERATING A PSEUDORANDOM SEQUENCE

(75) Inventors: Henri Gilbert, Bures sur Yvette (FR); Jacques Patarin, Versailles (FR); Côme Berbain, Montrouge (FR)

(73) Assignee: France Telecom, Paris (FR)

( * ) Notice: Subject to any disclaimer, the term of this patent is extended or adjusted under 35 U.S.C. 154(b) by 1016 days.

(21) Appl. No.: 11/922,382

(22) PCT Filed: Jun. 13, 2006

(86) PCT No.: PCT/FR2006/050553
§ 371 (c)(1),
(2), (4) Date: Aug. 19, 2009

(87) PCT Pub. No.: WO2006/134302
PCT Pub. Date: Dec. 21, 2006

(65) Prior Publication Data
US 2009/0319590 A1    Dec. 24, 2009

(30) Foreign Application Priority Data

Jun. 14, 2005   (FR) .................................... 05 06041

(51) Int. Cl.
*G06F 7/58*   (2006.01)
(52) U.S. Cl.
USPC ........................................................ 708/250
(58) Field of Classification Search
None
See application file for complete search history.

(56) References Cited

U.S. PATENT DOCUMENTS

| | | | |
|---|---|---|---|
| 7,937,427 B2* | 5/2011 | Chester et al. | 708/250 |
| 8,145,692 B2* | 3/2012 | Michaels et al. | 708/250 |
| 8,244,909 B1* | 8/2012 | Hanson et al. | 709/238 |
| 2004/0078407 A1* | 4/2004 | Naslund et al. | 708/492 |
| 2009/0292752 A1* | 11/2009 | Schneider | 708/250 |
| 2009/0319590 A1* | 12/2009 | Gilbert et al. | 708/250 |

OTHER PUBLICATIONS

P. L'ecuye, "A Tutorial on Uniform Variate Generation", Proceedings of the 1989 Winter Simulation Conference, pp. 40-49, Dec. 4, 1989.
D.E. Knuth, "The Art of Computer Programming: Random Numbers", Addison-Wesley, United States of America, pp. 26-40, chapter 3.2.2, Aug. 2000.

(Continued)

*Primary Examiner* — David H Malzahn
(74) *Attorney, Agent, or Firm* — Cozen O'Connor

(57) ABSTRACT

A method of generating a pseudorandom sequence of terms belonging to a finite body K of cardinal $q \geq 2$ intended to be used in a cryptographic procedure, said method comprising the iterative calculation, from an initialization n-tuple $X^{(0)} = (X^{(0)}_1, X^{(0)}_2, \ldots, X^{(0)}_n)$, where $n \geq 2$, of elements of K, of n-tuples $X^{(i)} = (X^{(i)}_1, X^{(i)}_2, \ldots, X^{(i)}_n)$ of elements of K (where $i = 1, 2, \ldots$), each n-tuple $X^{(i)}$ being obtained on iteration number i in a predetermined manner at least from certain components $Y^{(i)}_k$ of an m-tuple $Y^{(i)} = (Y^{(i)}_1, Y^{(i)}_2, \ldots, Y^{(i)}_m)$, where $m \geq n$, of elements of K and the terms of said pseudorandom sequence being extracted in a predetermined manner from the n-tuples X and/or the m-tuples Y. For at least one value of i, among said components $Y^{(i)}_k$ of the m-tuple $Y^{(i)}$ that are used to obtain the multiplet $X^{(i)}$, at least $E(n/2)$ of them are each represented by a predetermined second degree polynomial function, with coefficients in K, of the components of the n-tuple $X^{(i-1)}$.

15 Claims, 2 Drawing Sheets

(56) References Cited

OTHER PUBLICATIONS

M. Soriano, "Stream Ciphers based on NLFSR", Department of Applied Mathematics and Telematics, IEEE, pp. 528-553, 1998.
R.A. Rueppel, "Good Stream Ciphers are Hard to Design", ICCST, pp. 163-174, Oct. 3, 1989.
G. Jovandj, "Linear Statistical Weakness of Alleged RC4 Keystream Generator", School of Electrical Engineering, University of Belgrade, Springer Verlag, pp. 226-238, 1998.
A. Biryukov et al., "Real Time Cryptoanalysis of A5/1 on a PC", Springer Verlag, pp. 1-18, 2000.
A. Canteaut, "Le chiffrement à la vole", Pour La Science, pp. 1-8, 2002.
L. Blum et al., "A Simple Unpredictable Psuedo-Random Number Generator" SIAM Journal on Computing, Society for Industrial and Applied Mathematics, vol. 15, No. 2, pp. 364-383, May 1986.
P. Ekdahl, et al., "A New Version of the stream cipher SNOW", Dept. of Information Technology Lund University, Springer Verlag, pp. 47-61, 2002.
S. Fluhrer, "Weakness in the Key Scheduling Algorithm of RC4", Springer Verlag, 2001.

* cited by examiner

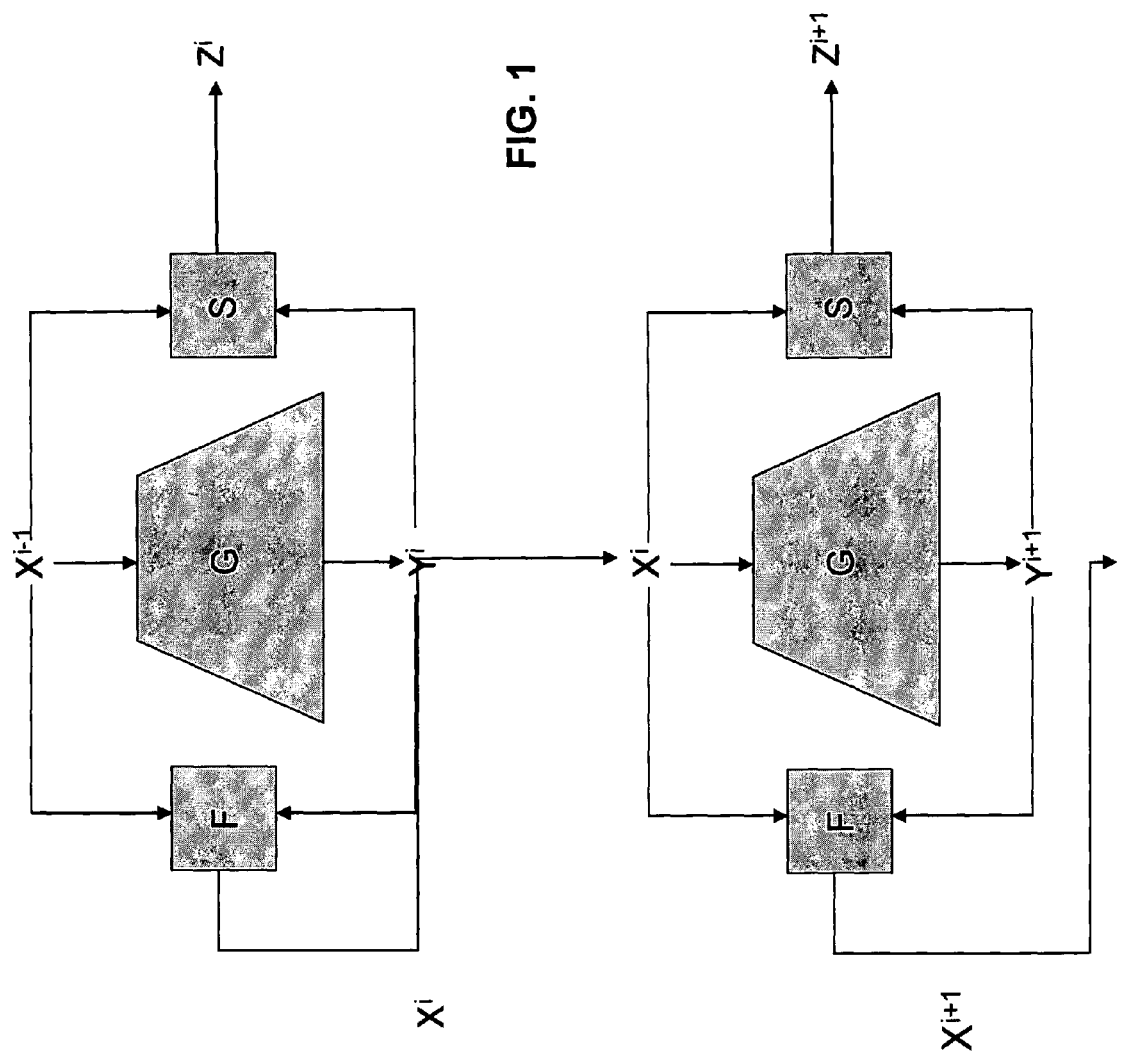

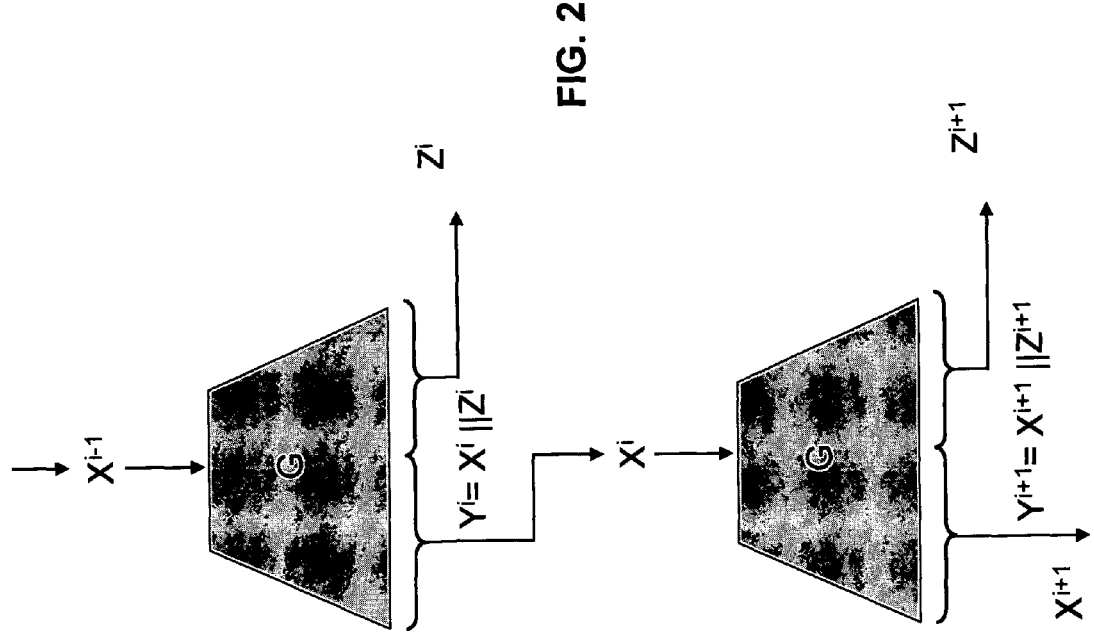

METHOD AND DEVICE FOR GENERATING A PSEUDORANDOM SEQUENCE

RELATED APPLICATIONS

This is a U.S. national stage of application No. PCT/FR2006/050317, filed on Jun. 13, 2006.

This application claims the priority of French patent application no. 05/06041 filed Jun. 14, 2005, the content of which is hereby incorporated by reference.

FIELD OF THE INVENTION

The present invention relates to producing pseudorandom sequences of symbols belonging to a given alphabet. Such sequences are used in particular in certain cryptographic procedures.

BACKGROUND OF THE INVENTION

A pseudorandom sequence is a sequence which, although produced deterministically, is impossible to distinguish, at least in a "reasonable" length of time, from a sequence of symbols in which each symbol is chosen entirely at random within the alphabet (what is meant by a length of time that is "reasonable" is obviously linked to the intended application and to the available computation power). In practice, a pseudorandom sequence is usually produced by initializing an appropriate algorithm by means of a secret parameter (called a "seed" or "key", depending on the context), and where appropriate an additional parameter, secret or not, called the "initialization vector".

The alphabet referred to above can be the binary set $\{0,1\}$, for example, or the set of digits from 0 to 9, or the alphanumeric set comprising the digits and the uppercase and lowercase letters. In the context of the present invention, it is assumed that the symbols of the alphabet belong to a finite body (or "Galois body" GF(q)) K of cardinal $q \geq 2$.

An important application of pseudorandom sequences is "stream encryption". This technique encrypts (in the cryptographic sense) a sequence $\{x_i\}$ of data in clear (indexed by i), with values in the alphabet, by means of another series $\{z_i\}$ of values in the same alphabet, where $\{z_i\}$ is precisely the sequence produced by a pseudorandom generator, to obtain an encrypted sequence $\{y_i\}$, also with values in the alphabet. In other words, a composition law $y_i = x_i * z_i$ internal to the alphabet is chosen; for example, that internal law can be "exclusive OR" if the alphabet is the binary alphabet $\{0, 1\}$. Stream encryption is also called "on the fly" encryption because the items of data are encrypted one by one—as opposed to encryption methods using blocks of data. Compared to block encryption, stream encryption has the advantage of reducing transmission delay and data storage problems, but obviously requires a pseudorandom symbol data rate at least as high as the data rate of the data in clear; the application to stream encryption is therefore reserved to relatively fast pseudorandom sequence generators.

Stream encryption is used in particular in the Internet exchange protection protocol called Transport Layer Security (TLS) (see the paper by T. Dierks and C. Allen, "The TLS Protocol, version 1.0, RFC 2246", Jan. 1999), one of the most widely used encryption algorithms of which is the RC4 algorithm (see the paper by J. D. Golic, "Linear Statistical Weakness of Alleged RC4 Keystream Generator", Proceedings of Advances in Cryptology—EUROCRYPT '97, pages 226 to 238, editor W. Fumy, Lecture Notes in Computer Science vol. 1233, Springer-Verlag), and to encrypt traffic and signaling on the GSM radio channel by means of algorithms the most widely used of which is the A5/1 algorithm (see the paper by A. Biryukov, A. Shamir, and D. Wagner, "Real Time Cryptanalysis of A5/1 on a PC", Proceedings of FSE 2000, pages 1 to 18, editor B. Schneier, Springer-Verlag 2000).

There are other important applications of pseudorandom sequences, for example in stochastic calculation and in public key authentication cryptographic protocols.

Many current stream algorithms, for example the A5/1 algorithm mentioned above, use recurrent linear sequences produced by linear feedback registers, possibly combined by means of non-linear functions (see the article by A. Canteaut, "Le chiffrement à la volée" ["On the fly encryption"], special issue of the magazine "Pour la Science", pages 86 and 87, Paris, Jul.-Oct. 2002).

Now, none of the known pseudorandom sequence production methods is entirely satisfactory in reconciling the following two conditions:

1) the existence of strong security arguments, in which great confidence can be placed in the practical impossibility of distinguishing the pseudorandom sequences produced from perfectly random sequences; and 2) efficiency, i.e. the use of minimum calculation resources (time, memory, and so on) for each symbol of the sequence produced.

In fact, the first condition requires that the solidity of the generator be founded as directly as possible on the difficulty of a clearly identified mathematical problem considered to be difficult. Algorithms satisfying this first condition are known, for example the Blum-Micali algorithm (see the paper by M. Blum and S. Micali, "How to generate cryptographically strong sequences of pseudo-random bits", J. Computing, vol. 13, no. 4, pages 850 to 863, Nov. 1984), which relies on the difficulty of the discrete logarithm problem, or the Blum-Blum-Shub algorithm (see the paper by L. Blum, M. Blum, and M. Shub, "A simple secure unpredictable pseudorandom number generator", J. Computing, vol. 15, pages 364 to 383, 1986) which relies on the difficulty of the factorization problem, but these two algorithms (and more generally all algorithms in this category) have a much lower efficiency than the fastest current algorithms, for example the RC4 algorithm mentioned above. This is why no known pseudorandom generator having strong security arguments (i.e. for which it can be shown that the success of an attack against the generator involves the capacity to solve a reputedly difficult mathematical problem) is used at present on an industrial scale.

Conversely, the security of the fastest known pseudorandom sequence generators, such as the RC4 algorithm, or certain generators using linear feedback registers, such as Snow 2 (see the paper by P. Ekdahl and T. Johansson, "A new version of the stream cipher Snow", Proceedings of Selected Areas in Cryptography 2002, pages 47 to 61, K. Nyberg and H. M. Heys editors, Springer-Verlag 2002), does not rely on the difficulty of clearly identified mathematical problems considered to be difficult. This results in potentially weak security: in the past, attacks have been discovered aimed at a number of generators in this category; thus the attack against the WEP encryption algorithm (a variant of the RC4 algorithm) used in the IEEE 802.11 system (better known as WiFi), discovered in 2001 by S. Fluhrer, I. Mantin, and A. Shamir (see the paper "Weaknesses in the Key Scheduling Algorithm of RC4", Proceedings of Selected Areas in Cryptography 2001, Springer-Verlag) represents a spectacular example of the possible consequences of the absence of strong security arguments.

SUMMARY OF THE INVENTION

A first aspect of the present invention therefore relates to a method of generating a pseudorandom sequence of terms belonging to a finite body K of cardinal q≥2 intended to be used in a cryptographic procedure, said method comprising the iterative calculation, from an initialization n-tuple $X^{(0)} = (X^{(0)}_1, X^{(0)}_2, \ldots, X^{(0)}_n)$, where n≥2, of elements of K, of n-tuples $X^{(i)} = (X^{(i)}_1, X^{(i)}_2, \ldots, X^{(i)}_n)$, of elements of K (where i=1, 2, ... ), each n-tuple $X^{(i)}$ being obtained on iteration number i in a predetermined manner at least from certain components $Y^{(i)}_k$ of an m-tuple $Y^{(i)} = (Y^{(i)}_1, Y^{(i)}_2, \ldots Y^{(i)}_m)$ where m≥n, of elements of K and the terms of said pseudorandom sequence being extracted in a predetermined manner from the n-tuples X and/or the m-tuples Y.

This method is noteworthy in that, for at least one value of i, among said components $Y^{(i)}_k$ of the m-tuple $Y^{(i)}$ that are used to obtain the multiplet $X^{(i)}$, at least E(n/2) of them are each represented by a predetermined second degree polynomial function, with coefficients in K, of the components of the n-tuple $X^{(i-1)}$ (the notation E (α) for any real number a designates its integer part).

It is clear that the security offered by the stream encryption method of the invention is optimized if it is applied, firstly to all iterations and secondly to at least n components $Y^{(i)}_k$ of the m-tuple $y^{(i)}$ from those that are used to obtain the multiplet $X^{(i)}$. If these two conditions are not satisfied, it is advisable to provide additional security means (for example, suppression at the output of certain terms of the pseudorandom sequence generated in this way).

Thus security is here the result of the difficulty of the problem of solving quadratic equations on a finite body (for reasons of simplicity of language, reference is made to a "system of quadratic equations", respectively a "system of quadratic polynomials", even where certain of those equations, respectively certain of those polynomials, are linear—given that the proportion of equations, respectively polynomials, of this system which are actually of the second degree must be significant). It can indeed be shown, subject to verification of a commonly accepted conjecture of the theory of complexity (referred to as "P≠NP"), that, whatever the finite body K concerned, solving this problem requires a time that is more than polynomial (even if the verification that a given candidate is or is not a solution of this system of equations can be effected in a polynomial time) (such a problem is denoted "NP-hard"). Moreover, even for relatively modest sizes of m and n (for example where K=GF(2) and where the values of m and n are sufficiently close together and of the order of 100), there is at present no known method of effective solution of random instances of this problem.

However, the production of pseudorandom symbols by the method of the invention has the advantage of being fast, at least for parameter values that are sufficiently small (but sufficiently large for the problem just referred to always to be considered difficult).

According to particular features, the n-tuple $X^{(i)}$ is obtained at least from the m-tuple $Y^{(i)}$ in various ways that are relatively simple to implement. For example:

$X^{(i)}$ is obtained by extracting the first n components of $Y^{(i)}$, i.e. $X^{(i)} = (Y^{(i)}_1, Y^{(i)}_2, \ldots, Y^{(i)}_n)$;

$X^{(i)} = N(Y^{(1)})$, where N is a linear or affine function on K or a sub-body of K;

$X^{(i)}$ is obtained by applying to the pair $(X^{(i-1)}, Y^{(i)})$ a linear or affine function F on K or a sub-body of K.

According to other particular features, an output pseudorandom series $Z^{(i)}$ is obtained (for the purposes of any use of the invention), the terms $Z^{(i)}$ of this output sequence being conveniently extractable from the n-tuples $X^{(i)}$ and/or the m-tuples $Y^{(i)}$ in various ways that are relatively simple to implement. For example:

m>n and an output value $Z^{(i)}$ is obtained by extracting the last (m−n) components of $Y^{(i)}$, i.e. $Z^{(i)} = (Y^{(i)}_{n+1}, Y^{(i)}_{n+2}, \ldots, Y^{(i)}_m)$;

an output value $Z^{(i)}$ is obtained, consisting of a t-tuple, where 1≤t≤m, of values of K, by applying to $X^{(i-1)}$ a linear or affine function M on K or a sub-body of K, i.e. $Z^{(i)} = M(X^{(i-1)})$;

there is deduced from the pair $(X^{(i-1)}, Y^{(i)})$ an output value $Z^{(i)}$, consisting of a t-tuple, where 1≤t≤m, of values of K, by means of a predetermined output function S, i.e. $Z^{(i)} = S(X^{(i-1)}, Y^{(i)})$; this function S can conveniently be linear or affine on K or a sub-body of K, for example, or quadratic.

A second aspect of the invention provides a generator of pseudorandom sequences of terms belonging to a finite body K of cardinal q≥2 intended to be used in a cryptographic procedure, said generator including means for iterative calculation, from an initialization n-tuple $X^{(0)} = (X^{(0)}_1, X^{(0)}_2, \ldots, X^{(0)}n)$, where n≥2, of elements of K, of n-tuples $X^{(i)} = (X^{(i)}_1, X^{(i)}_2, \ldots, X^{(i)}_n)$, of elements of K (where i=1, 2, ... ), each n-tuple $X^{(i)}$ being obtained on iteration number i in a predetermined manner at least from certain components $Y^{(i)}_k$ of an m-tuple $Y^{(i)} = (Y^{(i)}_1, Y^{(i)}_2, \ldots, Y^{(i)}_m)$ where m≥n, of elements of K and the terms of said pseudorandom sequence being extracted in a predetermined manner from the n-tuples X and/or the m-tuples Y. This generator is noteworthy in that, for at least one value of i, among said components $Y^{(i)}_k$ of the m-tuple $Y^{(i)}$ that are used to obtain the multiplet $X^{(i)}$, at least E(n/2) of them are each represented by a predetermined second degree polynomial function, with coefficients in K, of the components of the n-tuple $X^{(i-1)}$.

According to particular features, the pseudorandom sequence generator further comprises means for calculating $X^{(i)}$ by applying to the pair $(X^{(i-1)}, Y^{(i)})$ a linear or affine function F on K or a sub-body of K.

According to other particular features, the pseudorandom sequence generator further comprises means for deducing from the pair $(X^{(i-1)}, Y^{(i)})$ an output value $Z^{(i)}$ consisting of a t-tuple, where 1≤t≤m, of values of K, by means of a predetermined output function S, i.e. $Z^{(i)} = S(X^{(i-1)}, Y^{(i)})$; this function S can be linear or affine on K or a sub-body of K, for example, or quadratic.

The advantages offered by these generators are essentially the same as those offered by the corresponding methods succinctly described above.

Other aspects of the invention are directed to:

non-removable data storage means containing computer program code instructions for executing the steps of any one of the pseudorandom sequence generating methods briefly described above;

partially or totally removable data storage means containing computer program code instructions for executing the steps of any one of the pseudorandom sequence generating methods briefly described above; and a computer program containing instructions such that, when said program controls a programmable data processing device, said instructions cause said data processing device to execute any one of the pseudorandom sequence generating methods briefly described above.

The advantages offered by these data storage means and by this computer program are essentially the same as those offered by said methods.

BRIEF DESCRIPTION OF THE DRAWINGS

Other aspects and advantages of the invention become apparent on reading the following detailed description of particular embodiments, which are given by way of non-limiting examples. The description refers to the accompanying drawings, in which:

FIG. 1 is a block diagram illustrating one embodiment of the generator according to the invention; and FIG. 2 is a block diagram illustrating one particular version of the embodiment illustrated in FIG. 1 that is particularly simple to implement.

DETAILED DESCRIPTION OF THE DRAWINGS

As explained above, the present invention relies on the difficulty of the problem of solving m quadratic equations in n unknowns on a finite body K with q elements. This problem can be formulated precisely as follows:

given a system (G) of m≥2 quadratic equations in n unknowns $x_1$ to $x_n$ belonging to a finite body K, of the form $$\sum_{1 \leq i \leq j \leq n} \alpha_k^{(ij)} x_i x_j + \sum_{1 \leq j \leq n} \beta_k^{(j)} x_j + \gamma_k = y_k \quad (1 \leq k \leq m),$$

in which the coefficients $\alpha_k^{(ij)}$, $\beta_k^{(j)}$ and $\gamma_k$ belong to K, and where the quantities $y_k$ also belong to K;

find a solution $X = (x_1, x_2, \ldots, x_n)$.

Below G denotes the function, described by the system of equations (G), that associates with an n-tuple $X = (x_1, x_2, \ldots, x_n)$ of input values the m-tuple $Y = (y_1, y_2, \ldots, y_m)$ of output values.

According to the invention, the pseudorandom generator calculates iteratively the multiplet of components $Y^{(i)}_k$ (where k=1, 2, ..., m), each of which is a function of one or more of the n components $X^{(i-1)}_j$ (where j=1, 2, ..., n). During at least one iteration number I, the calculated multiplet $Y^{(I)}$ comprises as least E(n/2) components (among those that will be used to obtain the new current state $X^I$, see below), each represented by a second degree function of the components of the n-tuple $X^{(I-1)}$. As explained above, the parameters q, m and n are preferably chosen so that:

solving a system of m quadratic equations in n unknowns on K can be considered difficult, which requires that the values of m and n be sufficiently large, and that their orders of magnitude be sufficiently close together (for example, we can take $q^n$ and $q^m$ both between $2^{80}$ and $2^{400}$); and the calculations can be effected efficiently, which requires that the values of q, m and n are sufficiently small (for example, we can take q less than one thousand with m and n less than a few hundred).

It should further be noted that, the greater the number of null coefficients $\alpha_k^{(ij)}$, $\beta_k^{(j)}$ in (G), the faster the calculations.

One embodiment of the invention, illustrated in FIG. 1, is described next. In this embodiment, for each value of i, all the components of the m-tuple $Y^{(i)}$ are second degree functions with coefficients in K of the components of n-tuple $X^{(i-1)}$; moreover, the same second degree functions are re-used on each iteration, i.e. the same predetermined function G of the type described above is used on each iteration.

Firstly, during an initialization step, an n-tuple $X^{(0)}$ is constituted. According to the intended use of the generator, $X^{(0)}$ can depend on a public seed, a secret key, an initialization vector or a combination of the above elements; an initialization vector is an additional parameter, generally not secret, enabling the same secret key to be used more than once to generate different pseudorandom sequences.

Iterative steps are then executed to produce, from the initial state $X^{(0)}$ and by the method described below, a pseudorandom sequence $Z^{(i)}$ (in which i=1, 2, ...) consisting of t-tuples of elements of K, where t is a constant between 1 and m. The total number of iterations can be between 1 and $2^{50}$, for example.

At iteration i, the preceding current state $X^{(i-1)}$ consisting of an n-tuple of elements of K is taken as an input value for executing the following sub-steps:

1) an m-tuple $Y^{(i)}$ of values of K is deduced from $X^{(i-1)}$ using the quadratic function G defined above, i.e. $Y^{(i)} = G(X^{(i-1)})$;

2) an output value $Z^{(i)}$ is obtained by applying to the pair $(X^{(i-1)}, Y^{(i)})$ a selected output function S, i.e. $Z^{(i)} = S(X^{(i-1)}, Y^{(i)})$; and 3) a new current state $X^{(i)}$ consisting of an n-tuple of values of K, is obtained by applying to the pair $(X^{(i-1)}, Y^{(i)})$ a chosen feedback function F, i.e. $X^{(i)} = F(X^{(i-1)}, Y^{(i)})$.

In FIG. 1, this process is represented sequentially (two successive iterations), but it could equally well be represented in a looped manner. What is important to note here is that the successive steps of the method according to the invention can be executed by a single electronic circuit.

There follow a few possible choices for the feedback function F referred to above:

the function F is formally independent of $X^{(i-1)}$ and a new current state $X^{(i)}$ is simply obtained by extracting the first n components of $Y^{(i)}$, i.e. $X^{(i)} = (Y^{(i)}_1, Y^{(i)}_2, \ldots, Y^{(i)}_n)$: this choice is illustrated in FIG. 2;

the function F is linear or affine on K or on a sub-body of K; in particular, the function F can be formally independent of $X^{(i-1)}$, so that $X^{(i)} = N(Y^{(i)})$, where N is a linear or affine function on K or on a sub-body of K.

There follow a few possible choices for the output function S referred to above:

the function S is formally independent of $X^{(i-1)}$, and the output value $Z^{(i)}$ is simply obtained by extracting the last t=m-n components of $Y^{(i)}$, i.e. $Z^{(i)} = (Y^{(i)}_{n+1}, Y^{(i)}_{n+2}, \ldots, Y^{(i)}_m)$ (this evidently assumes that m is strictly greater than n): this choice is illustrated in FIG. 2;

the function S is linear or affine (i.e. represented by a matrix) on K or on a sub-body of K; in particular, the function S can be formally independent of $Y^{(i)}$, so that $Z^{(i)} = M(X^{(i-1)})$, where M is a linear or affine function on K or on a sub-body of K;

said function S is quadratic.

To finish, a few possible applications of the invention are referred to, in which the choice has been made to call on exit only on the sequence $Z^{(i)}$.

It has been seen that the sequence $Z^{(i)}$ consists of t-tuples of elements of K. To obtain a composite sequence of elements of K as such (scalars), the t components of each $Z^{(i)}$ can be sent sequentially, for example.

A "shortened" sequence of elements of K can then be constructed, i.e. a sequence in which each term is eliminated or retained according to a predetermined rule as a function of the terms preceding and/or following the term concerned.

A sequence can also be constructed in which each symbol is the result of adding into K a predetermined number of symbols from the sequence $Z^{(i)}$ (for example two by two).

Finally, if the alphabet has the cardinal $q=2^p$, and if it is wished to produce a pseudorandom sequence of bits, each of the pseudorandom elements of K obtained in this way can be converted into a sequence of p bits.

The invention claimed is:

1. A method of generating a pseudorandom sequence of terms belonging to a finite body K of cardinal q 2 intended to be used in a cryptographic procedure, the method comprising:
   performing, by a data processing device including a memory, an iterative calculation from an initialization n-tuple $X^{(0)}=(X^{(0)}_1, X^{(0)}_2, \ldots, X^{(0)}_n)$, in which n≥2, of elements of K, n-tuples $X^{(i)}=(X^{(i)}_1, X^{(i)}_2, \ldots, X^{(i)}_n)$, and elements of K (where i=1, 2, ...), each n-tuple $X^{(i)}$ being obtained on iteration number i in a predetermined manner at least from certain components $Y^{(i)}_k$ of an m-tuple $Y^{(i)}=(Y^{(i)}_1, Y^{(i)}_2, \ldots, Y^{(i)}_m)$, where m≥n;
   performing, by the data processing device including the memory, an iterative extraction of elements of K and terms of said pseudorandom sequence in a predetermined manner from at least one of the n-tuples X and the m-tuples Y; and
   representing at least E(n/2) of at least one value of i, among said components $Y^{(i)}_k$ of the m-tuple $Y^{(i)}$ that are used to obtain a multiplet $X^{(i)}$, by a predetermined second degree polynomial function, with coefficients in K, of the components of the n-tuple $X^{(i-1)}$, K being the finite body, q being a number of elements of the finite body, X being the n-tuple and Y being the m-tuple and E being an integer part for any real number.

2. The method according to claim 1, wherein $X^{(i)}$ is obtained by extracting the first n components of $Y^{(i)}$ comprising $X^{(i)}=(Y^{(i)}_1, Y^{(i)}_2, \ldots, Y^{(i)}_n)$.

3. The method according to claim 1, wherein $X^{(i)}=N(Y^{(i)})$, where N is one of a linear and affine function on one of K and a sub-body of K.

4. The method according to claim 1, wherein $X^{(i)}$ is obtained by applying to one of a linear and affine function F on one of K and a sub-body of K to a pair of tuples $(X^{(i-1)}, Y^{(i)})$.

5. The method according to claim 1, wherein m>n and an output value $Z^{(i)}$ is obtained by extracting a last (m−n) components of $Y^{(i)}$ comprising $Z^{(i)}=(Y^{(i)}_{n+1}, Y^{(i)}_{n+2}, \ldots, Y^{(i)}_m)$.

6. The method according to claim 1, further comprising:
   applying to $X^{(i-1)}$ one of a linear and affine function M on one of K and a sub-body of K comprising $Z^{(i)}=M(X^{(-1)})$ to obtain an output value $Z^{(i)}$ consisting of a t-tuple of values of K, where 1≤t≤m.

7. The method according to claim 1, further comprising:
   deducing from the pair of tuples $(X^{(i-1)}, Y^{(i)})$, using a predetermined output function S comprising $Z^{(i)}=S(X^{(i-1)}, Y^{(i)})$, an output value $Z^{(i)}$ consisting of a t-tuple of values of K, where 1≤t≤m.

8. The method according to claim 7, wherein said function S is one of linear and affine on one of K and a sub-body of K.

9. The method according to claim 7, wherein said function S is quadratic.

10. The method according to claim 1 wherein said memory includes a non-removable data storage means containing computer program code instructions for executing the steps of the method according to claim 1.

11. The method according to claim 1 wherein said memory includes a partially or totally removable data storage means containing computer program code instructions for executing the steps of the method according to claim 1.

12. The method according to claim 1 including a computer program containing instructions such that, when said program controls said programmable data processing device, said instructions cause said data processing device to execute the method according to claim 1.

13. A generator of pseudorandom sequences of terms belonging to a finite body K of cardinal q≥2 intended to be used in a cryptographic procedure, said generator including electronic circuitry for performing an iterative calculation, from an initialization n-tuple $X^{(0)}=(X^{(0)}_1, X^{(0)}_2, \ldots, X^{(0)}_n)$, where n≥2, of elements of K, n-tuples $X^{(i)}=(X^{(i)}_1, X^{(i)}_2, \ldots, X^{(i)}_n)$, and elements of K (where i=1, 2, ...), each n-tuple $X^{(i)}$ being obtained on iteration number i in a predetermined manner at least from certain components $Y^{(i)}_k$ of an m-tuple $Y^{(i)}=(Y^{(i)}_1, Y^{(i)}_2, \ldots, Y^{(i)}_m)$, where m≥n, of elements of K and terms of said pseudorandom sequence being extracted in a predetermined manner from at least one of the n-tuples X and the m-tuples Y, wherein, for at least one value of i, among said certain components $Y^{(i)}_k$ of the m-tuple $Y^{(i)}$ that are used to obtain a multiplet $X^{(i)}$, at least E(n/2) of the certain components $Y^{(i)}_k$ are each represented by a predetermined second degree polynomial function, with coefficients in K, of components of the n-tuple $X^{(i-1)}$, K being the finite body, q being a number of elements of the finite body, X being the n-tuple and Y being the m-tuple and E being an integer part for any real number.

14. The pseudorandom sequence generator according to claim 13, further comprising:
   means for calculating $X^{(i)}$ by applying to a pair of tuples $(X^{(i-1)}, Y^{(i)})$ one of a linear and affine function F on one of K and a sub-body of K.

15. The pseudorandom sequence generator according to claim 13, further comprising:
   means for deducing from the pair of tuples $(X^{(i-1)}, Y^{(i)})$ an output value $Z^{(i)}$ consisting of a t-tuple of values of K, where 1≤t≤m, by means of a predetermined output function S comprising $Z^{(i)}=S(X^{(i-1)}, Y^{(i)})$.

* * * * *